United States Patent
Takahashi

(10) Patent No.: US 9,735,633 B2
(45) Date of Patent: Aug. 15, 2017

(54) ROTOR FOR ROTATING ELECTRIC MACHINE

(71) Applicant: DENSO CORPORATION, Kariya, Aichi-pref. (JP)

(72) Inventor: Yuki Takahashi, Obu-shi (JP)

(73) Assignee: DENSO CORPORATION, Kariya (JP)

( * ) Notice: Subject to any disclaimer, the term of this patent is extended or adjusted under 35 U.S.C. 154(b) by 622 days.

(21) Appl. No.: 14/069,791

(22) Filed: Nov. 1, 2013

(65) Prior Publication Data
US 2014/0125183 A1 May 8, 2014

(30) Foreign Application Priority Data
Nov. 2, 2012 (JP) .................................. 2012-242829

(51) Int. Cl.
*H02K 1/27* (2006.01)
(52) U.S. Cl.
CPC ........... *H02K 1/276* (2013.01); *H02K 1/2766* (2013.01); *H02K 2213/03* (2013.01)
(58) Field of Classification Search
CPC ... H02K 1/276; H02K 1/2766; H02K 2213/03
USPC .......................... 310/156.53, 156.56, 156.57
IPC ....................................................... H02K 1/27
See application file for complete search history.

(56) References Cited

U.S. PATENT DOCUMENTS

| 7,786,641 | B2 * | 8/2010 | Nishijima | H02K 1/276 310/156.53 |
| 2008/0007131 | A1 * | 1/2008 | Cai | H02K 1/2766 310/156.38 |
| 2008/0093944 | A1 * | 4/2008 | Takahashi | H02K 1/2766 310/156.02 |
| 2009/0079287 | A1 * | 3/2009 | Hattori | H02K 1/2766 310/156.53 |

(Continued)

FOREIGN PATENT DOCUMENTS

| JP | 2003-116235 | 4/2003 |
| JP | 2006-311730 | 11/2006 |

(Continued)

OTHER PUBLICATIONS

Office Action (2 pages) dated Sep. 30, 2014 issued in corresponding Japanese Application No. 2012-242829 and English translation (2 pages).

*Primary Examiner* — John K Kim
(74) *Attorney, Agent, or Firm* — Nixon & Vanderhye PC

(57) ABSTRACT

A rotor includes a rotor core having a plurality of pairs of magnet-receiving holes and a plurality of magnets respectively received in the magnet-receiving holes. Each pair of the magnet-receiving holes is arranged in a substantially V-shape that opens toward a stator side. For each pair of the magnet-receiving holes, there are provided a pair of corresponding magnetic flux barriers and a corresponding center bridge. The corresponding magnetic flux barriers are formed so as to respectively extend radially inward from magnetic pole centerline-side ends of the pair of the magnet-receiving (Continued)

holes. The corresponding center bridge radially extends between the corresponding magnetic flux barriers to separate them from each other. The corresponding center bridge is configured to include a radially inner portion and a radially outer portion located radially outward of the radially inner portion. The radially inner portion has a greater circumferential width than the radially outer portion.

6 Claims, 6 Drawing Sheets

(56) References Cited

U.S. PATENT DOCUMENTS

| | | | |
|---|---|---|---|
| 2009/0140592 A1* | 6/2009 | Rahman | H02K 1/2766 310/156.53 |
| 2009/0224624 A1 | 9/2009 | Kumar et al. | |
| 2011/0241468 A1* | 10/2011 | Inagaki | H02K 1/2766 310/156.32 |
| 2011/0278977 A1* | 11/2011 | Utaka | H02K 1/2766 310/156.53 |
| 2012/0139378 A1* | 6/2012 | Endo | H02K 1/2766 310/156.21 |
| 2012/0200193 A1 | 8/2012 | Sano et al. | |
| 2012/0321932 A1 | 12/2012 | Ise et al. | |
| 2013/0147299 A1* | 6/2013 | Rahman | H02K 1/2706 310/156.01 |
| 2014/0125182 A1* | 5/2014 | Takahashi | H02K 1/2766 310/156.11 |
| 2014/0125183 A1* | 5/2014 | Takahashi | H02K 1/276 310/156.53 |

FOREIGN PATENT DOCUMENTS

| | | |
|---|---|---|
| JP | 2011-165481 | 8/2011 |
| JP | 2011-211860 | 10/2011 |
| JP | 2012-165481 | 8/2012 |

* cited by examiner

000# ROTOR FOR ROTATING ELECTRIC MACHINE

CROSS-REFERENCE TO RELATED APPLICATION

This application is based on and claims priority from Japanese Patent Application No. 2012-242829, filed on Nov. 2, 2012, the content of which is hereby incorporated by reference in its entirety into this application.

BACKGROUND

1. Technical Field

The present invention relates to rotors for rotating electric machines that are used in, for example, motor vehicles as electric motors and electric generators.

2. Description of Related Art

There are known rotors for rotating electric machines that are used in, for example, motor vehicles as electric motors and electric generators. Those rotors include a rotor core and a plurality of permanent magnets. The rotor core is configured to be disposed in radial opposition to a stator of the rotating electric machine. The rotor core has a plurality of pairs of magnet-receiving holes formed therein. Each pair of the magnet-receiving holes is arranged in a substantially V-shape that opens toward the stator side. Each of the permanent magnets is received in a corresponding one of the magnet-receiving holes of the rotor core. Further, for each pair of the magnet-receiving holes, the two corresponding permanent magnets which are respectively received in the two magnet-receiving holes of the pair are arranged so as to together form one magnetic pole of the rotor. In addition, for each pair of the magnet-receiving holes, there is formed a corresponding center bridge that extends in a radial direction of the rotor core between the two magnet-receiving holes of the pair to separate them from each other.

Japanese Unexamined Patent Application Publication No. 2011-211860 discloses a technique of providing, for each pair of the magnet-receiving holes of the rotor core, a pair of magnetic flux barriers (or magnetic voids) that respectively extend from magnetic pole centerline-side ends of the pair of the magnet-receiving holes toward a longitudinal axis of the rotor core (or radially inward). Further, the corresponding center bridge is radially extended toward the longitudinal axis of the rotor core so as to also separate the pair of the magnetic flux barriers from each other. Furthermore, the corresponding center bridge has an internal barrier formed at its circumferential center and is thus circumferentially divided by the internal barrier into two parts.

Consequently, by providing the magnetic flux barriers for each pair of the magnet-receiving holes and the internal barrier in the corresponding center bridge, it becomes difficult for magnetic flux to flow along the d-axis (or along the centerline of the magnetic pole). In other words, the d-axis inductance is reduced. As a result, it becomes possible to reduce magnetic flux leakage along the d-axis toward the longitudinal axis of the rotor core (or radially inward). Moreover, by providing the magnetic flux barriers and the internal barrier, the weight and thus the inertia of the rotor core can be reduced.

However, with the technique disclosed in the above patent document, the radial length of the corresponding center bridge is increased by the radial length of the magnetic flux barriers. Consequently, the circumferential width of the corresponding center bridge becomes small relative to the radial length, thereby making it difficult to secure a sufficient strength of the corresponding center bridge to withstand the centrifugal force during rotation of the rotor. Moreover, since the corresponding center bridge is circumferentially divided by the internal barrier into the two parts, the circumferential width of each of the two parts of the corresponding center bridge is approximately half the circumferential width of a conventional center bridge which has no internal barrier formed therein. Consequently, the strength of the corresponding center bridge is considerably lowered in comparison with the strength of the conventional center bridge.

SUMMARY

According to an exemplary embodiment, a rotor for a rotating electric machine is provided which includes a hollow cylindrical rotor core and a plurality of magnets. The rotor core is configured to be disposed in radial opposition to a stator of the rotating electric machine. The rotor core has a plurality of groups of magnet-receiving holes formed therein. Each group includes at least one pair of the magnet-receiving holes. The pair of the magnet-receiving holes is arranged in a substantially V-shape that opens toward the stator side. Each of the magnets is received in a corresponding one of the magnet-receiving holes of the rotor core. For each group of the magnet-receiving holes of the rotor core, all the corresponding magnets which are respectively received in the magnet-receiving holes of the group are arranged so as to together form one magnetic pole of the rotor. The magnetic pole has a centerline C1 that radially extends to bisect the magnetic pole in a circumferential direction of the rotor core. For each group of the magnet-receiving holes, there are provided a pair of corresponding magnetic flux barriers and a corresponding center bridge in the rotor core. The corresponding magnetic flux barriers are formed so as to respectively extend radially inward from centerline C1-side ends of the pair of the magnet-receiving holes of the group. The corresponding center bridge radially extends between the corresponding magnetic flux barriers to separate them from each other. The corresponding center bridge is configured to include a radially inner portion and a radially outer portion that is located radially outward of the radially inner portion. The radially inner portion has a greater circumferential width than the radially outer portion.

With the above configuration of the corresponding center bridge, it is possible to secure a sufficient strength of the corresponding center bridge to withstand the centrifugal force during rotation of the rotor.

Moreover, with the corresponding magnetic flux barriers formed in the rotor core, it becomes difficult for magnetic flux to flow along the d-axis (or along the centerline C1 of the magnetic pole). In other words, the d-axis inductance is reduced. Consequently, it becomes possible to reduce magnetic flux leakage along the d-axis.

In addition, with the corresponding magnetic flux barriers formed in the rotor core, the weight and thus the inertia of the rotor core are reduced.

Preferably, for each group of the magnet-receiving holes of the rotor core, the corresponding magnetic flux barriers extend radially inward of an imaginary line segment A-B which connects two points A and B respectively on the corresponding magnets received in the pair of the magnet-receiving holes of the group; the two points A and B are positioned radially innermost in the corresponding magnets. The corresponding magnetic flux barriers also respectively extend circumferentially outward of the two points A and B.

Preferably, for each group of the magnet-receiving holes of the rotor core, a boundary between the radially inner and radially outer portions of the corresponding center bridge is located radially inward of an imaginary line segment C-D which connects two points C and D; the two points C and D respectively fall at centerline C1-side ends of radially-inner wall surfaces of the pair of the magnet-receiving holes of the group.

At least part of the radially inner portion of the corresponding center bridge may be formed as a broadening portion which gradually broadens radially inward so as to have its circumferential width gradually increasing in the radially inward direction.

The corresponding center bridge may have an internal barrier formed at its circumferential center so as to be circumferentially divided by the internal barrier into two parts.

Each of the magnet-receiving hole groups may include only the pair of the magnet-receiving holes.

Otherwise, each of the magnet-receiving hole groups may include, in addition to the pair of the magnet-receiving holes, one or more pairs of additional magnet-receiving holes which are located radially outward of the pair of the magnet-receiving holes. In this case, each pair of the additional magnet-receiving holes is also arranged in a substantially V-shape that opens toward the stator side.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
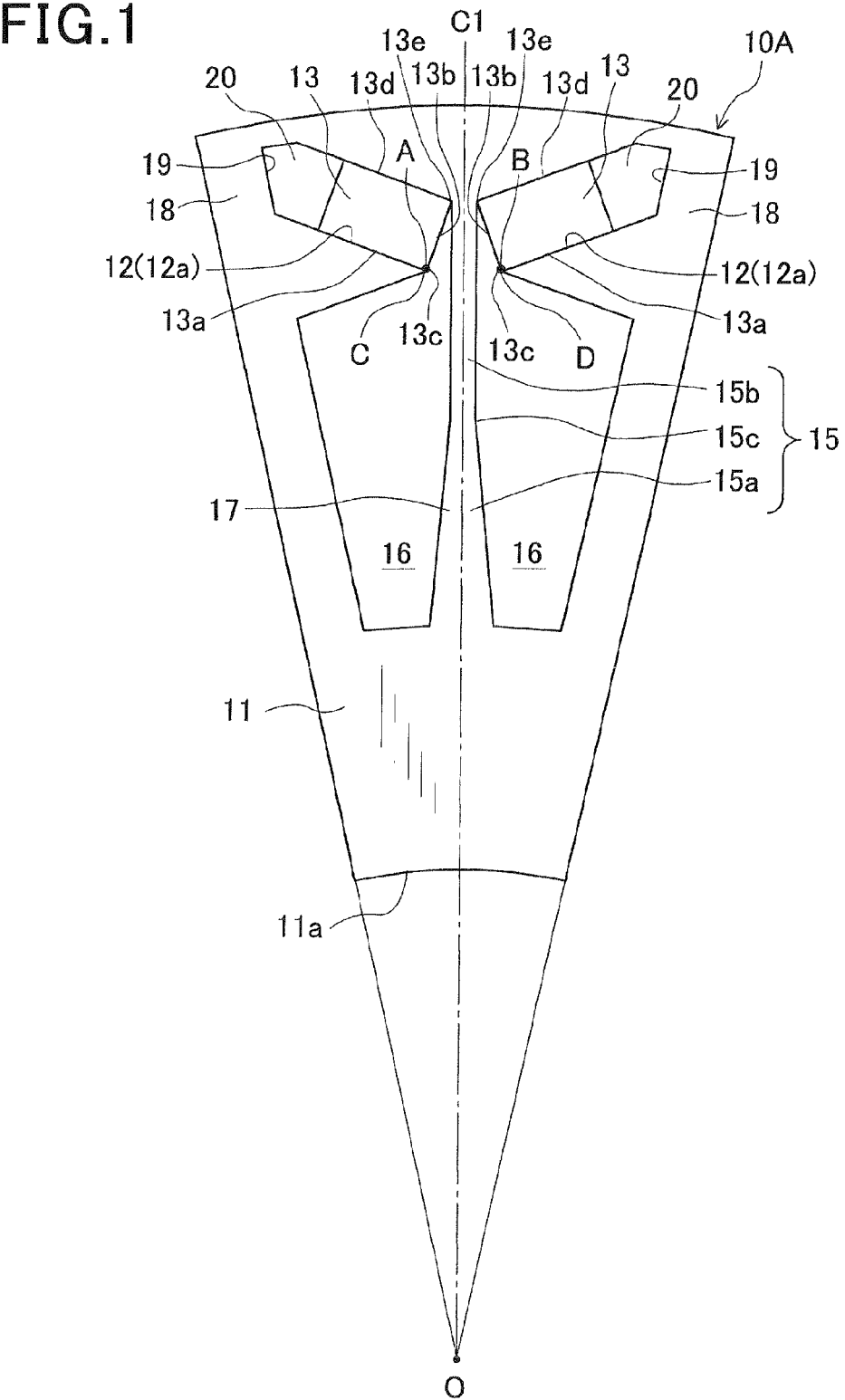
FIG. 1 is an axial view of a portion of a rotor according to a first embodiment, the portion making up one magnetic pole of the rotor.

Exemplary embodiments and their modifications will be described hereinafter with reference to FIGS. 1-6. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

[First Embodiment]

FIG. 1 shows the overall configuration of a rotor 10A according to a first embodiment.

In the present embodiment, the rotor 10A is designed to be used in, for example, an electric motor (not shown) for a motor vehicle. The motor includes, in addition to the rotor 10A, a housing, a stator and a rotating shaft, none of which are shown in FIG. 1. The housing is configured to receive both the rotor 10A and the stator therein such that the rotor 10A is disposed radially inside the stator with a predetermined air gap formed between a radially outer periphery of the rotor 10A and a radially inner periphery of the stator. That is to say, the motor is of an inner rotor type. The rotating shaft is rotatably supported at opposite ends thereof by the housing via a pair of bearings (not shown). The rotor 10A is configured to be fixedly fitted on the rotating shaft so as to rotate along with the rotating shaft.

As shown in FIG. 1, the rotor 10A includes a rotor core 11 and a plurality of permanent magnets 13 embedded in the rotor core 11. That is to say, in the present embodiment, the rotor 10A is configured as an Interior Permanent Magnet (IPM) rotor.

The rotor core 11 is formed, by axially laminating a plurality of annular magnetic steel sheets, into a hollow cylindrical shape. Consequently, at the radial center of the rotor core 11, there is formed a through-hole 11a, in which the rotating shaft is to be fixedly fitted so as to rotate together with the rotor core 11.

The permanent magnets 13 are embedded in the rotor core 11 so as to form a plurality of magnetic poles of the rotor 10A on the radially outer periphery of the rotor core 11. The magnetic poles are equally spaced in the circumferential direction of the rotor core 11 at predetermined intervals so that the polarities of the magnetic poles alternate between north and south in the circumferential direction. In addition, in the present embodiment, the number of the magnetic poles of the rotor 10A is equal to, for example, 12 (i.e., 6 north poles and 6 south poles).

More specifically, in the present embodiment, the rotor core 11 has a plurality (e.g., 12) of pairs of magnet-receiving holes 12 formed in the vicinity of the radially outer periphery of the rotor core 11. Each of the magnet-receiving holes 12 extends in the axial direction of the rotor core 11 so as to penetrate the rotor core 11 in the axial direction. Further, each of the magnet-receiving holes 12 has a cross section perpendicular to a longitudinal axis O of the rotor core 11, the shape of which is basically a rectangle.

In addition, it should be noted that though there is shown only one pair of the magnet-receiving holes 12 in FIG. 1, the plurality of pairs of the magnet-receiving holes 12 are equally spaced in the circumferential direction of the rotor core 11 at predetermined intervals.

Moreover, in the present embodiment, each pair of the magnet-receiving holes 12 is arranged so as to form a substantially V-shape that opens toward the radially outer periphery of the rotor core 11. Further, for each pair of the magnet-receiving holes 12, there is formed a corresponding center bridge 15 of the rotor core 11 which extends in a radial direction of the rotor core 11 so as to separate the two magnet-receiving holes 12 of the pair from each other. The corresponding center bridge 15 is provided for causing magnetic flux saturation and thereby impeding formation of a magnetic circuit between the two magnet-receiving holes 12. The configuration of the corresponding center bridge 15 will be described in more detail later.

Furthermore, for each pair of the magnet-receiving holes 12, the two magnet-receiving holes 12 of the pair are symmetrically formed with respect to the corresponding center bridge 15; the width directions of the two magnet-receiving holes 12 respectively coincide with the extending directions of the two sides of the substantially V-shape formed by the two magnet-receiving holes 12. In addition, both the longitudinal directions of the two magnet-receiving holes 12 are parallel to the longitudinal axis O of the rotor core 11.

Each of the permanent magnets 13 is inserted in a corresponding one of the magnet-receiving holes 12 of the rotor core 11 so as to extend in the axial direction of the rotor core 11. Further, each of the permanent magnets 13 has a substantially rectangular cross section perpendicular to the axial direction of the rotor core 11 (i.e., the direction of the longitudinal axis O of the rotor core 11). That is to say, in the present embodiment, each of the permanent magnets 13 has a substantially cuboid shape. In addition, in the present embodiment, each of the permanent magnets 13 is implemented by, for example, a sintered neodymium magnet.

Moreover, for each pair of the magnet-receiving holes 12 of the rotor core 11, the two permanent magnets 13 which are respectively inserted in the two magnet-receiving holes 12 of the pair are arranged so that the polarities (north or south) of the two permanent magnets 13 are the same on the radially outer periphery of the rotor core 11. Consequently, the two permanent magnets 13 together form one of the magnetic poles of the rotor 10A on the radially outer periphery of the rotor core 11. In addition, as shown in FIG. 1, when viewed along the axial direction of the rotor core 11, the two permanent magnets 13 are symmetrically arranged and extend obliquely with respect to a centerline C1 of the magnetic pole; the centerline C1 extends in the radial direction, along which the corresponding center bridge 15 of the rotor core 11 is formed, and bisects the magnetic pole in the circumferential direction of the rotor core 11. Consequently, the two permanent magnets 13 also together form a substantially V-shape that opens radially outward (i.e., toward the radially outer periphery of the rotor core 11).

Furthermore, in each of the magnet-receiving holes 12 of the rotor core 11, the corresponding permanent magnet 13 is positioned such that a corner portion 13e of the corresponding permanent magnet 13 abuts a radially-outer root portion of the corresponding center bridge 15; the corner portion 13e is formed between a radially-outer side surface 13d and a centerline C1-side side surface 13b of the corresponding permanent magnet 13.

Moreover, in the present embodiment, for each pair of the magnet-receiving holes 12 of the rotor core 11, there are provided a pair of magnetic flux barriers 16 that respectively extend from centerline C1-side ends of the pair of the magnet-receiving holes 12 toward the longitudinal axis O of the rotor core 11. Further, the corresponding center bridge 15, which is formed between the pair of the magnet-receiving holes 12, is radially extended toward the longitudinal axis O of the rotor core 11 so as to also separate the pair of the magnetic flux barriers 16 from each other.

More specifically, in the present embodiment, the pair of the magnetic flux barriers 16 extend on the longitudinal axis O side of an imaginary line segment A-B which connects two points A and B respectively on the corresponding permanent magnets 13 received in the pair of the magnet-receiving holes 12; the two points A and B are positioned in the corresponding permanent magnets 13 closest to the longitudinal axis O. Further, each of the magnetic flux barriers 16 extends circumferentially outward of the point A or B on the corresponding permanent magnet 13. In addition, the two points A and B respectively fall on the corner portions 13c formed between the radially-inner side surfaces 13a and the centerline C1-side side surfaces 13b of the corresponding permanent magnets 13.

Furthermore, in the present embodiment, the corresponding center bridge 15 is configured to include a radially inner portion 15a and a radially outer portion 15b that is located radially outward of the radially inner portion 15a. Further, the radially inner portion 15a has a greater circumferential width (i.e., width in the circumferential direction of the rotor core 11) than the radially outer portion 15b.

More specifically, in the present embodiment, the radially outer portion 15b is formed to have a constant circumferential width in the radial direction of the rotor core 11. In other words, the circumferential width of the radially outer portion 15b is set to be constant from the radially outer end to the radially inner end of the radially outer portion 15b. On the other hand, the circumferential width of the radially inner portion 15a is set so as to gradually increase from the radially outer end to the radially inner end of the radially inner portion 15a. That is, the radially inner portion 15a is formed as a broadening portion 17 which gradually broadens from its radially outer end to its radially inner end. In other words, the radially inner portion 15a is configured so as to taper from the radially inner end to the radially outer end thereof. Consequently, the corresponding center bridge 15 is smoothly changed in circumferential width at the boundary 15c between the radially inner and radially outer portions 15a and 15b, thereby reducing stress concentration occurring at the boundary 15c during rotation of the rotor 10A.

Moreover, in the present embodiment, the boundary 15c between the radially inner and radially outer portions 15a and 15b of the corresponding center bridge 15 is located on the longitudinal axis O side of an imaginary line segment C-D which connects two points C and D; the two points C and D respectively fall at the centerline C1-side ends of the radially-inner wall surfaces 12a of the pair of the magnet-receiving holes 12 of the rotor core 11. The two points C and D are located both away from the corresponding center bridge 15 by a predetermined distance and respectively on opposite circumferential sides of the corresponding center bridge 15. The two points C and D are positioned closest to both the corresponding center bridge 15 and the longitudinal axis O of the rotor core 11 in the radially-inner wall surfaces 12a of the pair of the magnet-receiving holes 12. In addition, in the present embodiment, the two points C and D are respectively located at the boundaries between the pair of the magnet-receiving holes 12 and the pair of the magnetic flux barriers 16; the two points C and D also respectively adjoin the corner portions 13c of the corresponding permanent magnets 13 that are respectively received in the pair of the magnet-receiving holes 12.

Furthermore, in the present embodiment, the rotor core 11 has a plurality of q-axis core portions 18 through which q-axis magnetic flux flows. Each of the q-axis core portions 18 is formed between a corresponding one circumferentially-adjacent pair of the magnetic poles of the rotor 10A. Further, for each of the magnet-receiving holes 12 of the rotor core 11, there is provided an outer magnetic flux barrier (or magnetic void) 19 between the corresponding permanent magnet 13 received in the magnet-receiving hole 12 and the corresponding q-axis core portion 18 adjacent to the magnet-receiving hole 12. In other words, the outer magnetic flux barrier 19 is provided on the corresponding q-axis core portion 18 side of the magnet-receiving hole 12.

In addition, in the present embodiment, each of the permanent magnets 13 is fixedly held in the corresponding magnet-receiving hole 12 of the rotor core 11 by a filler 20 that is filled in the gaps between the permanent magnet 13 and the radially-outer and radially-inner wall surfaces of the corresponding magnet-receiving hole 12 as well as in the corresponding outer magnetic flux barrier 19. The filler 20 is made of a nonmagnetic material, such as resin.

After having described the configuration of the rotor 10A according to the present embodiment, advantages thereof will be described hereinafter.

As described above, in the present embodiment, the rotor 10A includes the hollow cylindrical rotor core 11 and the permanent magnets 13. The rotor core 11 is configured to be disposed in radial opposition to the stator of the motor. The rotor core 11 has a plurality of groups of the magnet-receiving holes 12 formed therein. Each group includes at least one pair of the magnet-receiving holes 12, more particularly only one pair of the magnet-receiving holes 12 in the present embodiment. The pair of the magnet-receiving holes 12 are arranged in the substantially V-shape that opens toward the stator side. Each of the permanent magnets 13 is received in the corresponding one of the magnet-receiving holes 12 of the rotor core 11. Further, for each group of the magnet-receiving holes 12 of the rotor core 11, all the corresponding permanent magnets 13 which are respectively received in the magnet-receiving holes 12 of the group are arranged so as to together form one magnetic pole of the rotor 10A. The magnetic pole has the centerline C1 that radially extends to bisect the magnetic pole in the circumferential direction of the rotor core 11. For each group of the magnet-receiving holes 12, there are provided the pair of the corresponding magnetic flux barriers 16 and the corresponding center bridge 15 in the rotor core 11. The corresponding magnetic flux barriers 16 are formed so as to respectively extend radially inward from the centerline C1-side ends of the pair of the magnet-receiving holes 12 of the group. The corresponding center bridge 15 radially extends between the corresponding magnetic flux barriers 16 to separate them from each other. The corresponding center bridge 15 is configured to include the radially inner portion 15a and the radially outer portion 15b that is located radially outward of the radially inner portion 15a. The radially inner portion 15a has a greater circumferential width than the radially outer portion 15b.

With the above configuration of the corresponding center bridge 15, it is possible to secure a sufficient strength of the corresponding center bridge 15 to withstand the centrifugal force during rotation of the rotor 10A.

Moreover, with the corresponding magnetic flux barriers 16 formed in the rotor core 11, it becomes difficult for magnetic flux to flow along the d-axis (or along the centerline C1 of the magnetic pole). In other words, the d-axis inductance is reduced. Consequently, it becomes possible to reduce magnetic flux leakage along the d-axis toward the longitudinal axis O of the rotor core 11.

In addition, with the corresponding magnetic flux barriers 16 formed in the rotor core 11, the weight and thus the inertia of the rotor core 11 are reduced.

In the present embodiment, the corresponding magnetic flux barriers 16 are formed so as to extend radially inward of the imaginary line segment A-B and respectively circumferentially outward of the two points A and B.

With the above formation of the corresponding magnetic flux barriers 16, it is possible to more reliably achieve the advantageous effects of reducing magnetic flux leakage along the d-axis and the weight of the rotor core 11.

In the present embodiment, the boundary 15c between the radially inner and radially outer portions 15a and 15b of the corresponding center bridge 15 is located radially inward of the imaginary line segment C-D.

With the above location of the boundary 15c, it is possible to reliably cause magnetic flux saturation to occur at the radially outer portion 15b of the corresponding center bridge 15, thereby making it difficult for magnetic flux to flow along the d-axis. Consequently, it is possible to effectively reduce magnetic flux leakage along the d-axis toward the longitudinal axis O of the rotor core 11.

In the present embodiment, the entire radially inner portion 15a of the corresponding center bridge 15 is formed as the broadening portion 17 which gradually broadens radially inward so as to have its circumferential width gradually increasing in the radially inward direction.

With the above formation of the radially inner portion 15a, it is possible to effectively reduce stress occurring in the radially inner portion 15a.

[Experiment 1]

This experiment has been conducted to determine the effect of the relative position of the boundary 15c between the radially inner and radially outer portions 15a and 15b of the corresponding center bridge 15 to the line segment C-D on the amount of magnetic flux flowing through the corresponding center bridge 15 in the rotor 10A according to the first embodiment.

Specifically, in the experiment, a plurality of sample rotors were prepared, all of which had the same configuration as the rotor 10A according to the first embodiment. However, for those sample rotors, the radial distance from the line segment C-D to the boundary 15c was varied in the range of −3 mm to +0.5 mm. Here, the radial distance was specified to take a positive value when the boundary 15c was located radially outward (or on the stator side) of the line segment C-D, be zero when the boundary 15c was located on the line segment C-D, and take a negative value when the boundary 15c was located radially inward (or on the longitudinal axis O side) of the line segment C-D. Then, each of the sample rotors was tested to measure the amount of magnetic flux flowing through the corresponding center bridge 15.

Figure 2:
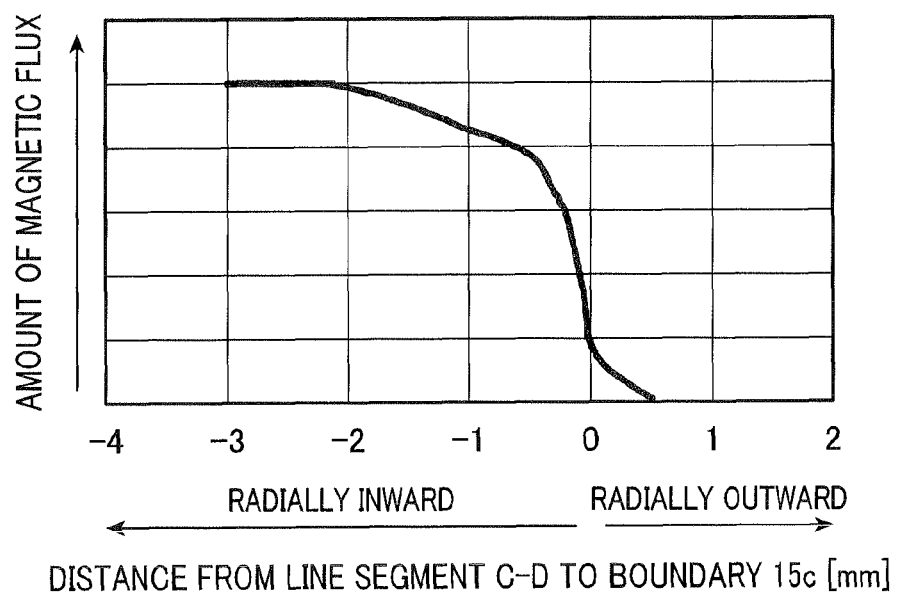
FIG. 2 is a graphical representation showing the test results of Experiment 1.

FIG. 2 shows the test results, where the horizontal axis represents the radial distance from the line segment C-D to the boundary 15c and the vertical axis represents the amount of magnetic flux flowing through the corresponding center bridge 15.

As shown in FIG. 2, the curve, which represents the relationship between the radial distance from the line segment C-D to the boundary 15c and the amount of magnetic flux flowing through the corresponding center bridge 15, had an inflection point when the radial distance was zero. Moreover, the amount of magnetic flux increased with decrease in the radial distance. However, when the radial distance had decreased to become less than −2 mm, the amount of magnetic flux became almost constant.

Accordingly, from the test results shown in FIG. 2, it has been made clear that to cause magnetic flux saturation to occur in the corresponding center bridge 15, it is necessary to locate the boundary 15c radially inward (or on the longitudinal axis O side) of the line segment C-D.

[First Modification]

As described previously, in the rotor 10A according to the first embodiment, the entire radially inner portion 15a of the corresponding center bridge 15 is formed as the broadening portion 17 which gradually broadens radially inward so as to have its circumferential width gradually increasing in the radially inward direction (see FIG. 1).

Figure 3:
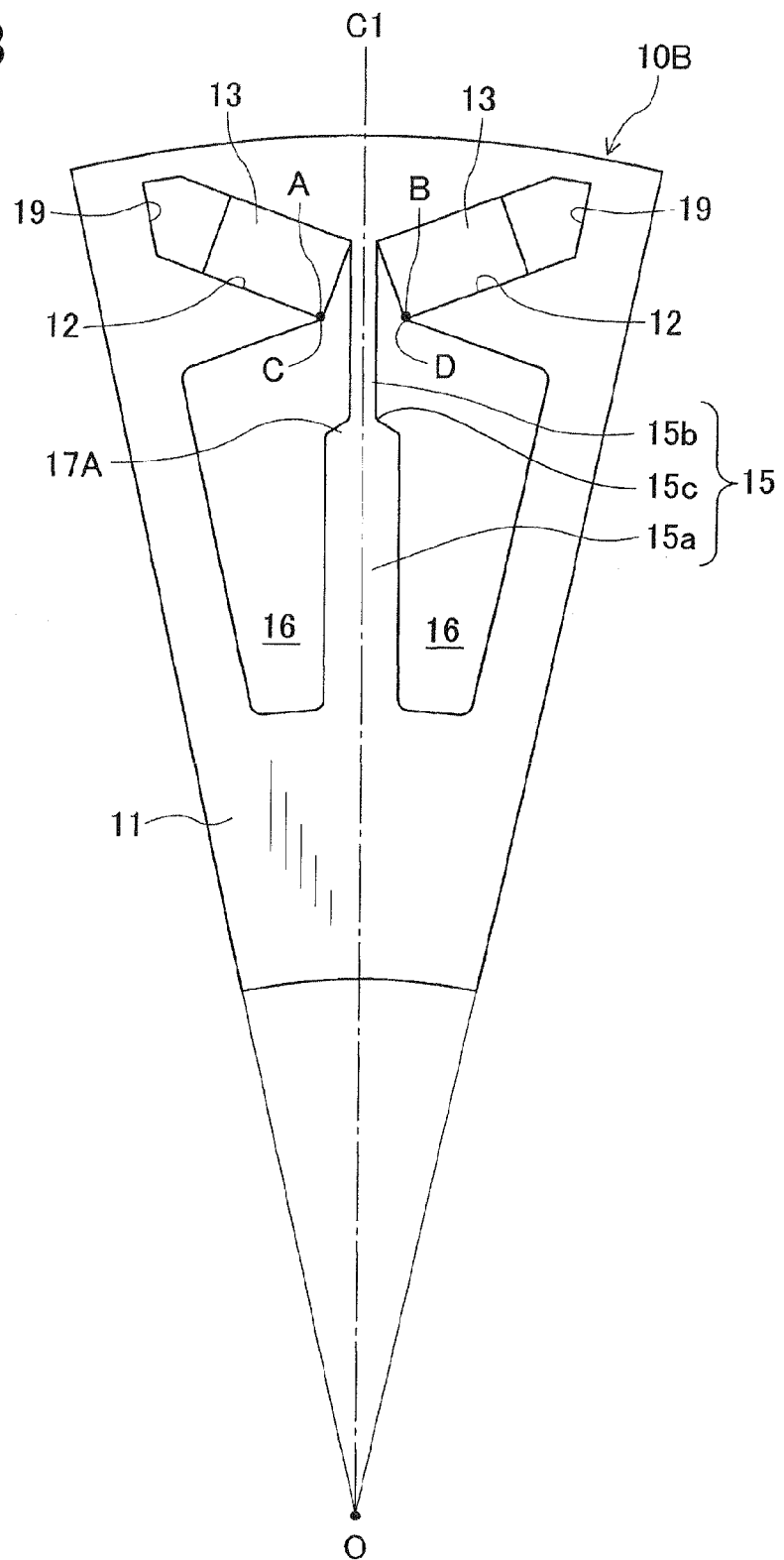
FIG. 3 is an axial view of a portion of a rotor according to a first modification, the portion making up one magnetic pole of the rotor.

In comparison, in a rotor 10B according to this modification, as shown in FIG. 3, only a small part of the radially inner portion 15a is formed as a broadening portion 17A which adjoins the radially outer portion 15b and broadens radially inward; the remaining part of the radially inner portion 15a is formed so as to have a constant circumferential width in the radial direction. The circumferential width of the remaining part is greater than that of the radially outer portion 15b. In addition, the outer surface of the broadening portion 17A is curved so as to smoothly connect the outer surfaces of the radially outer portion 15b and the remaining part (i.e., the constant-circumferential width part) of the radially inner portion 15a.

It should be noted that the remaining part of the radially inner portion 15a may also be formed as a broadening portion which broadens radially inward at a different broadening rate than the broadening portion 17A.

[Second Embodiment]

This embodiment illustrates a rotor 10C which has almost the same configuration as the rotor 10A according to the first embodiment; accordingly, only the differences therebetween will be described hereinafter.

In the rotor 10A according to the first embodiment, there is no internal barrier formed in the corresponding center bridge 15 (see FIG. 1).

Figure 4:
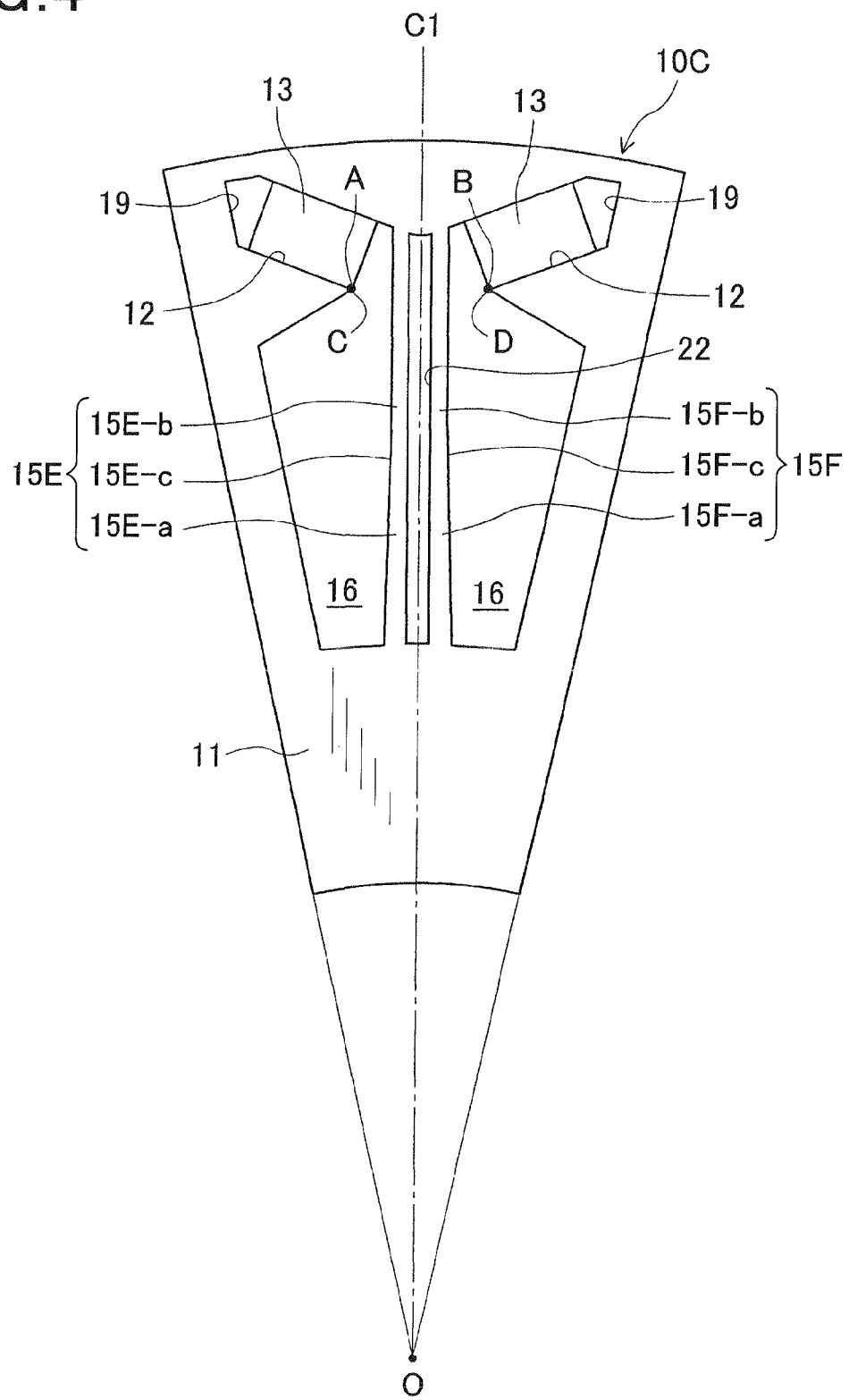
FIG. 4 is an axial view of a portion of a rotor according to a second embodiment, the portion making up one magnetic pole of the rotor.

In comparison, in the rotor 10C according to the present embodiment, as shown in FIG. 4, the corresponding center bridge 15 has an internal barrier (or void space) 22 formed at its circumferential center and is thus circumferentially divided by the internal barrier 22 into two parts, i.e., a first bridge 15E and a second bridge 15F.

Specifically, the internal barrier 22 is formed at the circumferential center of the corresponding center bridge 15 so as to penetrate the rotor core 11 in the axial direction and radially extend at a substantially constant circumferential width from the radially outer end to the radially inner end of the corresponding center bridge 15. Thus, the internal barrier 15 has a substantially rectangular cross section perpendicular to the axial direction of the rotor core 11 (or to the longitudinal axis O of the rotor core 11). By the internal barrier 15, the corresponding center bridge 15 is divided into the first and second bridges 15E and 15F, each of which has a radially inner portion (15E-a or 15F-a) and a radially outer portion (15E-b or 15F-b) that is located radially inward of the radially inner portion. The radially inner portion has a greater circumferential width than the radially outer portion.

More specifically, for each of the first and second bridges 15E and 15F, the radially outer portion (15E-b or 15F-b) is configured have a constant circumferential width in the radial direction of the rotor core 11. In other words, the circumferential width of the radially outer portion is set to be constant from the radially outer end to the radially inner end of the radially outer portion. On the other hand, the radially inner portion (15E-a or 15F-a) is formed to have its internal barrier 22-side surface on the same plane as the internal barrier 22-side surface of the radially outer portion and its magnetic flux barrier 16-side surface inclined circumferentially outward to the magnetic flux barrier 16-side surface of the radially outer portion. That is, as in the first embodiment, the entire radially inner portion is formed as a broadening portion which gradually broadens from its radially outer end to its radially inner end. Consequently, the circumferential width of the radially inner portion is gradually increased from the radially outer end to the radially inner end of the radially inner portion. In addition, as in the first embodiment, the boundary (15E-c or 15F-c) between the radially inner and radially outer portions is located radially inward (or on the longitudinal axis O side) of the line segment C-D.

The above-described rotor 10C according to the present embodiment has the same advantages as the rotor 10A according to the first embodiment.

In addition, in the rotor 10C according to the present embodiment, since the corresponding center bridge 15 is divided by the internal barrier 22 into the first and second bridges 15E and 15F, the circumferential width of each of the first and second bridges 15E and 15F is approximately half the circumferential width of the corresponding center bridge 15 in the first embodiment. However, with the above configuration of the first and second bridges 15E and 15F according to the present embodiment, it is still possible to secure a sufficient strength of the corresponding center bridge 15 to withstand the centrifugal force during rotation of the rotor 10C.

[Second Modification]

As described previously, in the rotor 10C according to the second embodiment, the internal barrier 22 is formed in the corresponding center bridge 15 so as to radially extend at the substantially constant circumferential width from the radially outer end to the radially inner end of the corresponding center bridge 15.

Figure 5:
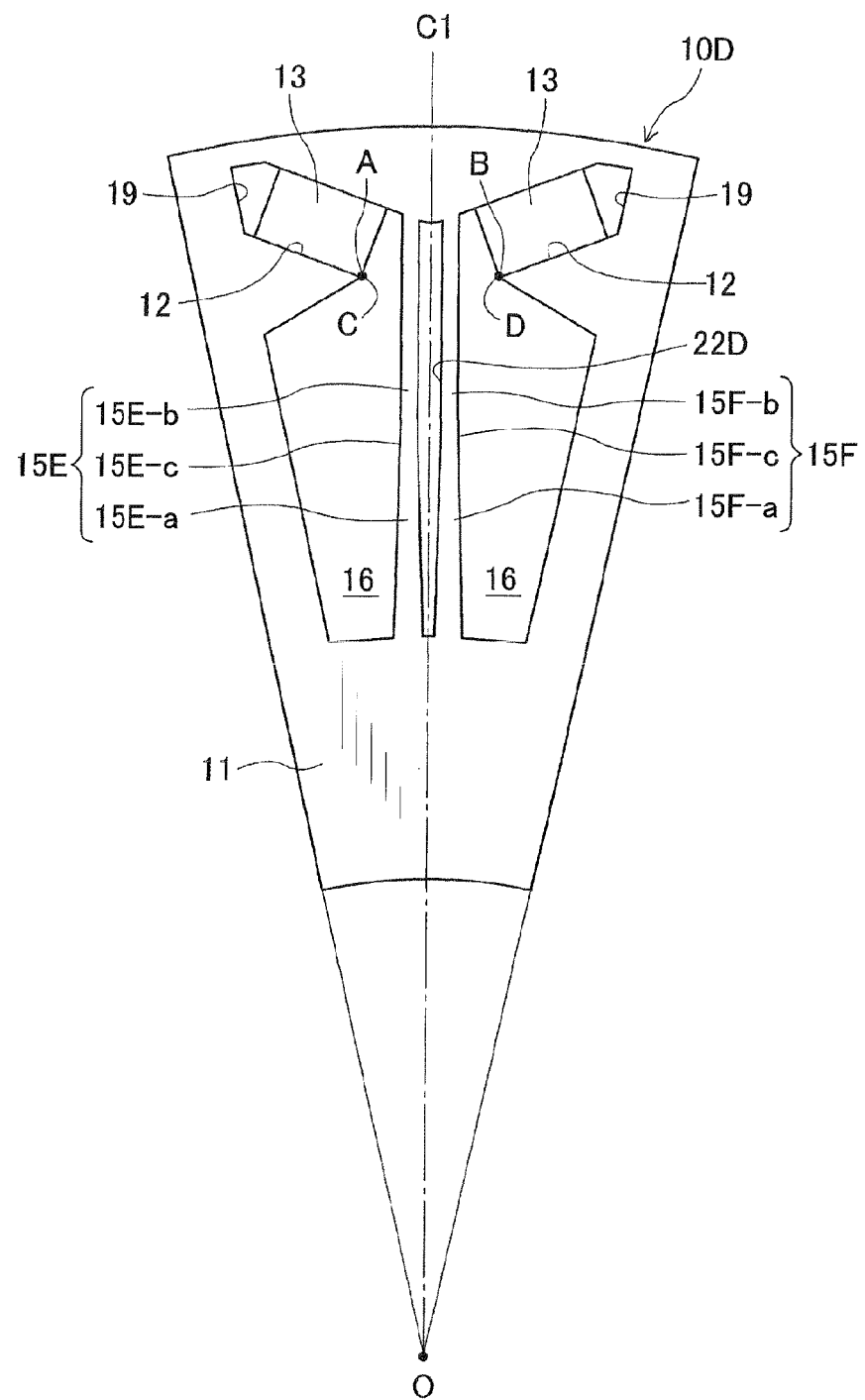
FIG. 5 is an axial view of a portion of a rotor according to a second modification, the portion making up one magnetic pole of the rotor.

In comparison, in a rotor 10D according to this modification, as shown in FIG. 5, an internal barrier 22D is formed in the corresponding center bridge 15 so that the circumferential width of the internal barrier 22D is substantially constant between the radially outer portions 15E-b and 15F-b of the first and second bridges 15E and 15F and gradually decrease in the radially inward direction between the radially inner portions 15E-a and 15F-a of the first and second bridges 15E and 15F.

More specifically, in the present modification, for each of the first and second bridges 15E and 15F, the radially inner portion (15E-a or 15F-a) is formed to have its internal barrier 22D-side surface inclined circumferentially inward (or toward the centerline C1) to the internal barrier 22D-side surface of the radially outer portion (15E-b or 15F-b) and its magnetic flux barrier 16-side surface inclined circumferentially outward to the magnetic flux barrier 16-side surface of the radially outer portion. Consequently, that portion of the internal barrier 22D which is formed between the radially inner portions 15E-a and 15F-a of the first and second bridges 15E and 15F tapers radially inward (or toward the longitudinal direction O of the rotor core 11); thus the circumferential width of that portion of the internal barrier 22D gradually decreases in the radially inward direction. In contrast, each of the radially inner portions 15E-a and 15F-a of the first and second bridges 15E and 15F tapers radially outward (or toward the stator side); thus, the circumferential width of each of the radially inner portions 15E-a and 15F-a gradually increases in the radially inward direction.

Compared to the second embodiment, the circumferential width of each of the radially inner portions 15E-a and 15F-a of the first and second bridges 15E and 15F in the present modification is increased, thereby enhancing the strength of the corresponding center bridge 15.

While the above particular embodiments and modifications of the present invention have been shown and described, it will be understood by those skilled in the art that various further modifications, changes, and improvements may be made without departing from the spirit of the invention.

For example, though not graphically shown, the invention can also be applied to rotors in which the permanent magnets 13 are asymmetrically arranged with respect to bridges provided between the magnetic poles.

In the previous embodiments and modifications, each of the magnet-receiving hole groups includes only the single pair of the magnet-receiving holes 12.

Figure 6:
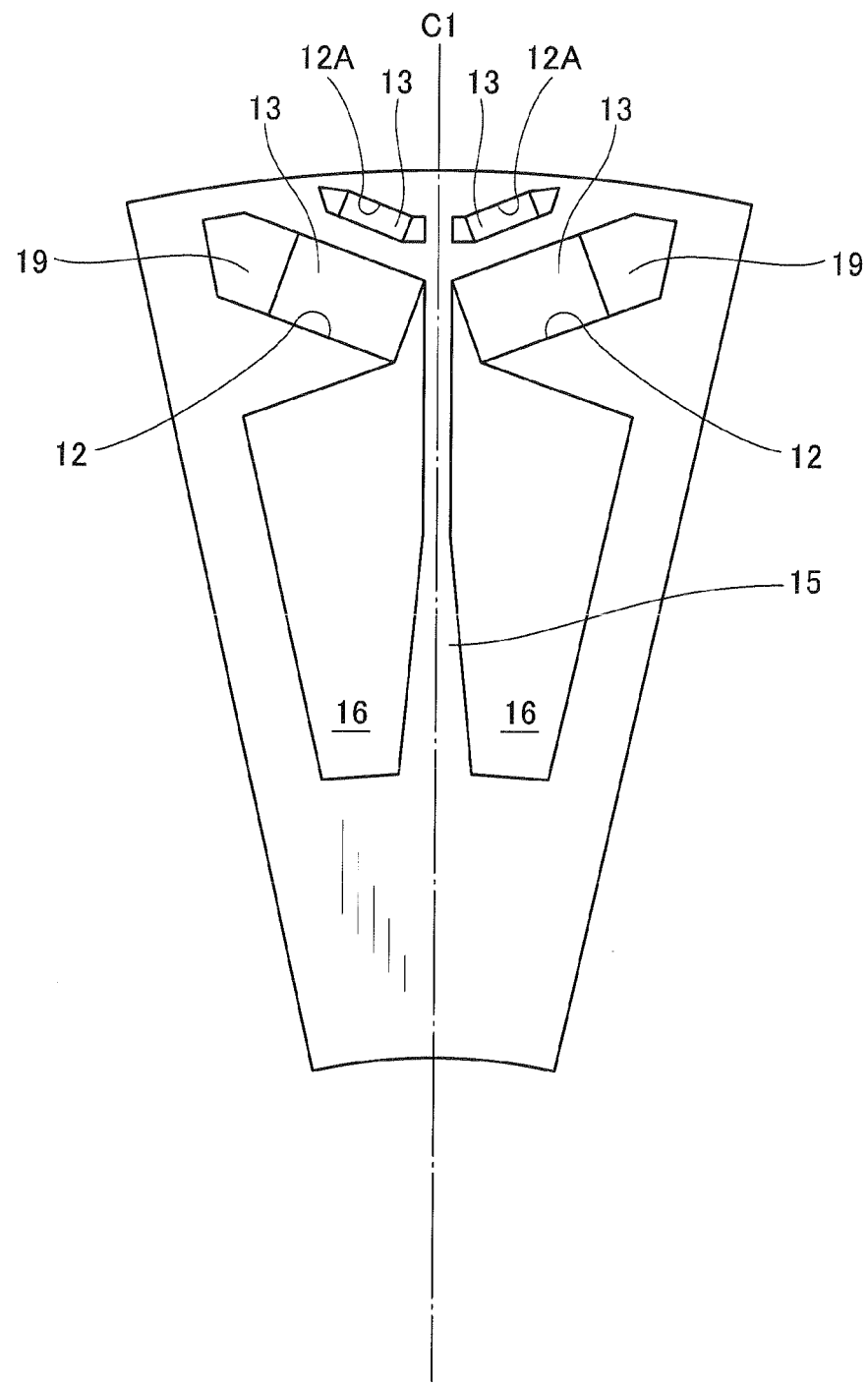
FIG. 6 is an axial view of a portion of a rotor according to another modification, the portion making up one magnetic pole of the rotor.

However, as shown in FIG. 6, each of the magnet-receiving hole groups may further include a pair of magnet-receiving holes 12A that are located radially outward of the pair of the magnet-receiving holes 12 from which the magnetic flux barriers 16 extend. In addition, in this case, the two magnet-receiving holes 12A are also symmetrically arranged with respect to the centerline C1 of the magnetic pole so as to together form a substantially V-shape that opens radially outward (or toward the stator side).

Furthermore, each of the magnet-receiving hole groups may include a total of 2n (i.e., n pairs) magnet-receiving holes, where n is a natural number. In this case, for each of the n pairs, the two magnet-receiving holes of the pair are symmetrically arranged with respect to the centerline C1 of the magnetic pole so as to together form a substantially V-shape that opens radially outward.

Otherwise, each of the magnet-receiving hole groups may include a total of 2n+1 (i.e., n pairs+1) magnet-receiving holes. In this case, for each of the n pairs, the two magnet-receiving holes of the pair are symmetrically arranged with respect to the centerline C1 of the magnetic pole so as to together form a substantially V-shape that opens radially outward. The remaining one magnet-receiving hole is formed at the centerline C1 of the magnetic pole.

In the previous embodiments and modifications, the invention is directed to the rotors 10A-10D for the inner rotor-type motors. However, the invention can also be applied to a rotor for an outer rotor-type rotating electric machine in which the rotor is disposed radially outside of a stator of the machine.

Moreover, in the previous embodiments and modifications, the invention is directed to the rotors 10A-10D for vehicular motors. However, the invention can also be applied to a rotor for an electric generator or a rotor for a motor generator that can selectively function either as an electric motor or as an electric generator.

What is claimed is:

1. A rotor for a rotating electric machine, the rotor comprising:
   a hollow cylindrical rotor core configured to be disposed in radial opposition to a stator of the rotating electric machine, the rotor core having a plurality of groups of holes, each of the holes including a magnet receiving hole portion and another hole portion having a magnetic flux barrier, each group including at least one pair of the magnet-receiving hole portions, the pair of the magnet-receiving hole portions being arranged in a substantially V-shape that opens toward the stator side; and
   a plurality of magnets each of which is received in a corresponding one of the magnet-receiving hole portions of the rotor core,
   wherein
   for each group of the magnet-receiving hole portions of the rotor core, all the corresponding magnets which are respectively received in the magnet-receiving hole portions of the group are arranged so as to together form one magnetic pole of the rotor, the magnetic pole having a centerline C1 that radially extends to bisect the magnetic pole in a circumferential direction of the rotor core,
   for each group of the magnet-receiving hole portions, there are provided a pair of corresponding other hole portions having magnetic flux barriers and a corresponding center bridge in the rotor core, the corresponding other hole portions having magnetic flux barriers being formed so as to respectively extend radially inward from centerline C1-side ends of the pair of the magnet-receiving hole portions of the group, the corresponding center bridge radially extending between the corresponding other hole portions having magnetic flux barriers to separate them from each other, and
   wherein
   the corresponding center bridge is configured to include a radially inner portion and a radially outer portion that is located radially outward of the radially inner portion,
   the radially inner portion has a greater circumferential width than the radially outer portion,
   the rotor core further has a plurality of q-axis core portions through which q-axis magnetic flux flows, each of the q-axis core portions being formed between one circumferentially-adjacent pair of the magnetic poles of the rotor,
   for each group of the magnet-receiving hole portions of the rotor core, the corresponding other hole portions having magnetic flux barriers extending radially inward of an imaginary line segment C-D which connects two points C and D, the two points C and D respectively falling at centerline C1-side ends of radially-inner wall surfaces of the pair of the magnet-receiving hole portions of the group, the magnetic flux barriers also respectively extending circumferentially from the two points C and D away from the centerline C1 of the magnetic pole beyond radially inner q-axis core portion-side ends of the corresponding magnets, and
   a boundary between the radially inner and radially outer portions of the corresponding center bridge is located radially inward of the imaginary line segment C-D.

2. The rotor as set forth in claim 1, wherein at least part of the radially inner portion of the corresponding center bridge is formed as a broadening portion which gradually broadens radially inward so as to have its circumferential width gradually increasing in the radially inward direction.

3. The rotor as set forth in claim 1, wherein the corresponding center bridge has an internal barrier formed at its circumferential center, and is thus circumferentially divided by the internal barrier into two parts.

4. The rotor as set forth in claim 1, wherein each of the magnet-receiving hole groups includes only the pair of the magnet-receiving hole portions.

5. The rotor as set forth in claim 1, wherein each of the magnet-receiving hole groups includes, in addition to the pair of the magnet-receiving hole portions, one or more pairs of additional magnet-receiving hole portions which are located radially outward of the pair of the magnet-receiving hole portions, and each pair of the additional magnet-receiving hole portions is also arranged in a substantially V-shape that opens toward the stator side.

6. The rotor as set forth in claim 1, wherein the magnetic flux barriers extend toward the longitudinal axis of the rotor core such that a radially inward surface of each of the magnetic flux barriers is closer to the radially inward surface of the rotor core than to the radially outward surface of the rotor core.

* * * * *